United States Patent
Graham

(10) Patent No.: US 7,506,015 B1
(45) Date of Patent: Mar. 17, 2009

(54) GENERATION OF A REMAINDER FROM DIVISION OF A FIRST POLYNOMIAL BY A SECOND POLYNOMIAL

(75) Inventor: Jeffrey Allan Graham, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 781 days.

(21) Appl. No.: 10/981,882

(22) Filed: Nov. 5, 2004

(51) Int. Cl.
*G06F 7/38* (2006.01)

(52) U.S. Cl. ...................................... 708/491

(58) Field of Classification Search ................. 708/491, 708/492
See application file for complete search history.

(56) References Cited

U.S. PATENT DOCUMENTS 5,905,664 A * 5/1999 Ko et al. ..................... 708/491
6,523,053 B1 * 2/2003 Lee et al. .................... 708/492
7,197,526 B1 * 3/2007 Qu ............................ 708/491

* cited by examiner

*Primary Examiner*—Chuong D Ngo
(74) *Attorney, Agent, or Firm*—LeRoy Maunu; Kim Kanzaki; Lois D. Cartier

(57) ABSTRACT

Generation a remainder from a division of a first polynomial by a second polynomial having a variable width. One or more embodiments include a first sub-circuit, a first adder, a second sub-circuit, and a second adder. The first sub-circuit is adapted to generate a first partial remainder, which has a fixed width greater than or equal to the width of the second polynomial, from the first polynomial excepting a least significant portion. The first adder is adapted to generate a sum of the least significant portion of the first polynomial and a most significant portion of the first partial remainder. The second sub-circuit is adapted to generate a second partial remainder from the sum. The second adder is adapted to generate the remainder from the second partial remainder and the first partial remainder excepting the most significant portion.

16 Claims, 6 Drawing Sheets

GENERATION OF A REMAINDER FROM DIVISION OF A FIRST POLYNOMIAL BY A SECOND POLYNOMIAL

FIELD OF THE INVENTION

The present invention generally relates to the evaluation of a remainder polynomial from a Galois field polynomial division.

BACKGROUND

The remainder from a Galois field polynomial division is useful for purposes such as encoding data for block error correcting codes, including Reed Solomon codes. Polynomial division is the division of a dividend polynomial by a divisor polynomial. The result of a polynomial division is a quotient polynomial and a remainder polynomial. A polynomial is a sum of products where each product is a coefficient value multiplied by an integer power of a variable. A polynomial may be specified by a vector of the coefficient values of the polynomial where the vector has a width equal to one plus the degree of the polynomial, the degree of the polynomial being the maximum power of the variable present in the polynomial. Conversely, a vector of arbitrary values may be used to define an associated polynomial. An example polynomial, $poly(x)=7x^3+6x^2+5$, has a degree of three and a width of four for the associated vector [7, 6, 0, 5]. For polynomial division over a Galois field, each of the coefficients in the dividend, divisor, quotient, and remainder polynomials are an element from the particular Galois field.

Reed Solomon codes are systematic block codes used for error correction. The input data is partitioned into vectors each containing K symbols. Each vector of input symbols is used to generate a vector containing R check symbols. The combination of K input symbols and R check symbols form an N symbol codeword that may be used to detect and correct corruption of the codeword. The R check symbols correspond to the remainder polynomial from a Galois field polynomial division, where the dividend polynomial is given by the vector of K input symbols and the divisor polynomial is a generator polynomial given by the particular Reed Solomon code that is being used. The generator polynomial has a degree equal to the required number of check symbols minus one.

Evaluating the remainder polynomial from a Galois field polynomial division is a complex operation requiring significant resources such as circuit area and computation time. In an application that continuously generates Reed Solomon encoded data, the evaluation of the remainder polynomial needs to achieve a throughput rate that equals or exceeds the data rate of the vectors of input symbols. Generally, the evaluation of the remainder polynomial is a recursive process requiring K iterations. Each of the iterations requires multiple, simultaneous, Galois field multiplications. The Galois field multiplications are intolerant to the inclusion of pipelining as the additional latency reduces throughput.

While a typical circuit for evaluation of the remainder polynomial for a block code uses a particular generator polynomial having a fixed degree, a flexible circuit for evaluation of the remainder polynomial for a Reed Solomon code uses a generator polynomial having a degree that may be varied. The flexible circuit allows the implementation of various block codes having various numbers of check symbols. The number of check symbols generated by the flexible circuit may even vary in real time by switching the generator polynomial used in real time.

The present invention may address one or more of the above issues.

SUMMARY OF THE INVENTION

The various embodiments of the invention generate a remainder from a division of a first polynomial by a second polynomial having a variable width. In one embodiment, the generation of the remainder includes a first sub-circuit, a first adder, a second sub-circuit, and a second adder. The first sub-circuit is adapted to generate a first partial remainder that has a fixed width greater than or equal to the variable width. A surplus number is given by a difference between the fixed width and the variable width. The first sub-circuit has an input arranged to receive coefficients of the first polynomial excepting the surplus number of least significant coefficients.

The first adder is adapted to generate a sum of data at first and second inputs. The first input is arranged to receive the surplus number of the least significant coefficients of the first polynomial, and the second input is arranged to receive the surplus number of most significant coefficients of the first partial remainder.

The second sub-circuit is adapted to generate a second partial remainder from the sum received at an input. The second adder is adapted to generate the remainder from data at first and second inputs. The first input is arranged to receive coefficients of the first partial remainder excepting the surplus number of the most significant coefficients, and the second input is arranged to receive the second partial remainder.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Various embodiments of the invention reduce the resources required for evaluation of the remainder polynomial for a division over a Galois field of a dividend polynomial by a divisor polynomial, with the divisor polynomial having a degree that may be varied. The dividend polynomial and the degree of the divisor polynomial may be inputs to the remainder evaluation. To reduce required resources, the polynomial division of a specified input polynomial by a specified degree divisor polynomial is decomposed into two stages. Each stage performs a remainder calculation for a polynomial division. In the first stage, a remainder is calculated for a polynomial division by a particular polynomial having a fixed degree. The first stage has reduced complexity, and the first stage reduces the degree of the polynomial that is processed by the second stage. In the second stage, a remainder is calculated for a polynomial division by the divisor polynomial having the specified degree.

Various embodiments of the invention may be advantageously used to implement efficient polynomial division in a programmable logic device (PLD). It will be appreciated that embodiments of the invention may also be advantageously used, for example, in application specific integrated circuits and custom integrated circuits. An example application is efficient data encoding using one or more Reed Solomon codes.

Figure 1:
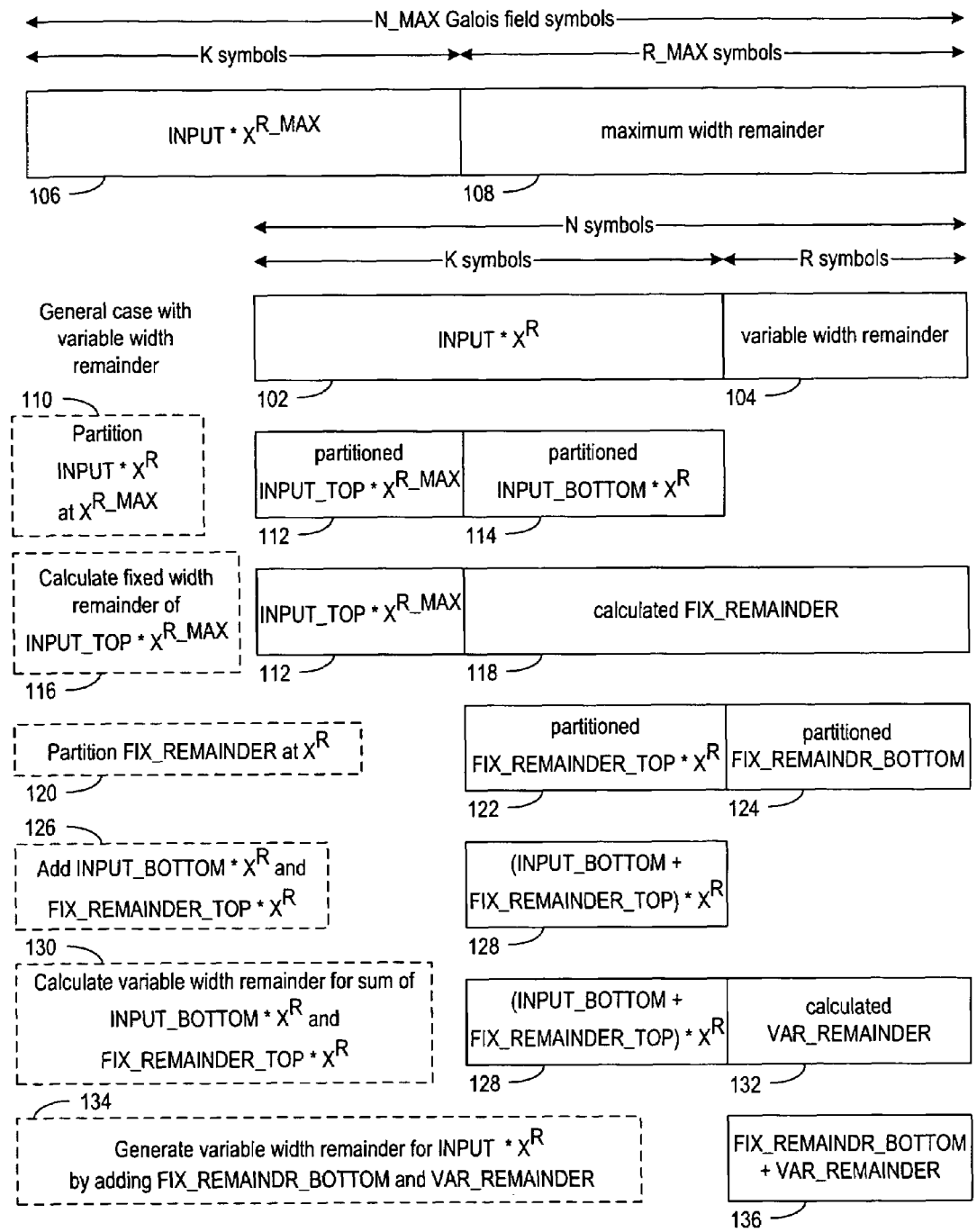
FIG. 1 is a chart illustrating polynomials generated during a remainder evaluation for a polynomial division with a variable divisor width, in accordance with one or more embodiments of the invention.

FIG. 1 is a chart illustrating polynomials generated during a remainder evaluation for a polynomial division with a variable divisor width in accordance with one or more embodiments of the invention. The scaled input polynomial that is divided by the divisor polynomial has an associated scaled vector 102 of coefficients with a width of K symbols from the Galois field. The remainder polynomial for the polynomial division has a degree that may vary between 0 and R_MAX−1, inclusive. The vector 104 of coefficients associated with the remainder polynomial correspondingly has a width, R, that may vary between 1 and R_MAX symbols from the Galois field. The remainder width, R, may potentially be specified by an input parameter. The scaled input vector 102 with K symbols and remainder vector 104 with R symbols may be combined to form an N symbol output vector or codeword.

The remainder of a polynomial division satisfies the equation:

[input(x)*$x^R$+remainder(x)] modulus divisor(x)=0, where input(x) is the input polynomial, input(x)*$x^R$ is the scaled input polynomial, remainder(x) is the remainder polynomial, and divisor(x) is the divisor polynomial having degree R. The input polynomial may be scaled by multiplying by a factor of $x^R$ before evaluating the remainder. The scaling by a factor of $x^R$ corresponds to the left shift by R symbols that is shown for scaled input vector 102.

The maximum width of the output vector has N_MAX symbols for a scaled input vector 106 with K symbols when the remainder vector 108 has the maximum width of R_MAX symbols. A circuit that calculates a fixed width remainder having R_MAX symbols for a particular divisor polynomial may be simplified because the Galois field multiplications performed during the remainder calculation are each multiplications by a constant from the Galois field. The first stage of the evaluation of the remainder for the polynomial division by a divisor polynomial having variable width is equivalent to a fixed-width remainder circuit that calculates an R_MAX symbol remainder for a particular divisor polynomial.

The scaled by R input vector 102, input(x)*$x^R$, is partitioned in operation 110 at $x^{R\_max}$ into upper portion 112, input_top(x)*$x^{R\_MAX}$ and lower portion 114, input bottom(x) *$x^R$. After optional padding of the upper portion 112 with zero values to extend the length to K symbols (not shown) the upper portion 112 has a format that may be processed in operation 116 by the fixed-width circuit that calculates an R_MAX symbol remainder 118 for a particular divisor polynomial. The remainder vector 118 with R_MAX symbols, fix_remainder(x), is the result from the first stage of the variable-width remainder evaluation.

At operation 120, the fixed-width remainder vector 118 is partitioned at $x^R$ into upper portion 122, fix_remainder_top (x)*$x^R$, and lower portion 124, fix_remainder_bottom(x). At operation 126, the lower portion 114 of the scaled input vector 102 and the upper portion 122 of the fixed-width remainder vector 118 are added to yield vector 128.

Vector 128 is the input to a circuit for polynomial division by the divisor polynomial that has variable width R that may be specified by an input parameter. At operation 130, the variable-width circuit calculates an R symbol remainder 132, var_remainder(x). The variable-width remainder vector 132 and the lower portion 124 of the fixed-width remainder vector 118 are summed at operation 134 to yield the result vector 136 for the evaluation of the remainder of the scaled input vector 102 by the divisor having degree R.

It will be appreciated that the various vectors 102, 104, 106, 108, 112, 114, 118, 122, 124, 128, 132, and 136 may not be drawn to scale. For example, typical values for K, R_MAX, and N_MAX are 239, 16, and 255 respectively, and generally K is much greater than R_MAX. Accordingly, vectors 102, 106, and 112 may be much wider than illustrated. The first stage for the remainder evaluation reduces the width of the vectors processed from K input symbols to R_MAX intermediate symbols using Galois field multiplications that are multiplication of variable data by a constant. It will also be appreciated that for R less than R_MAX, the number of input symbols, K, may be increased up to N_MAX−R instead of padding input vector 112 with zeroes as previously discussed.

Figure 2:
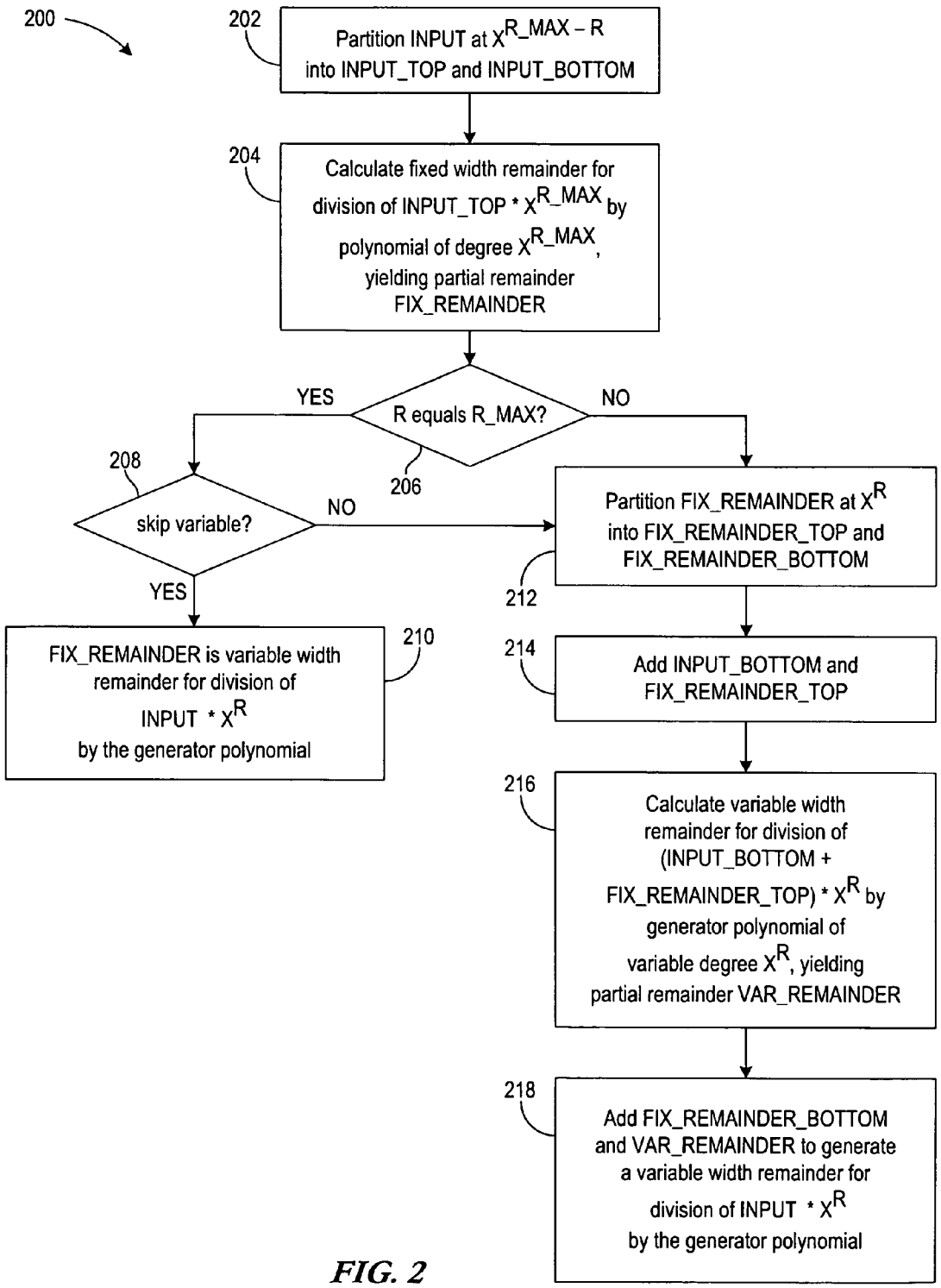
FIG. 2 is a flow diagram of a process for calculating a remainder for a polynomial division with a variable divisor width, in accordance with one or more embodiments of the invention.

FIG. 2 is a flow diagram of a process 200 for calculating a remainder for a polynomial division with a variable divisor width in accordance with one or more embodiments of the invention. The variable-width divisor polynomial has a width, R, which may be varied in a range from 1 to a maximum of R_MAX.

At step 202, the input polynomial is partitioned at $x^{R\_MAX-R}$ into an upper portion and a lower portion. It will be appreciated that a partitioning of the input polynomial at $x^{R\_MAX-R}$ is similar to a partitioning at $x^{R\_MAX}$ of the input polynomial scaled by a factor of $x^R$. At step 204, the upper portion of the input polynomial is scaled by a factor of $x^{R\_MAX}$ and the remainder is calculated for the division of the scaled upper portion of the input polynomial by a divisor polynomial having a fixed width of R_MAX.

Decisions 206 and 208 are optional decisions allowing the result of step 204 to be used, when R equals R_MAX, as the result for the evaluation of the variable-width remainder. In one embodiment, the latency to calculate the variable-width remainder is reduced when R equals R_MAX by decisions 206 and 208 causing process 200 to proceed to step 210. In another embodiment, decision 208 causes process 200 to proceed to step 212 even though R equals R_MAX, for example, to provide constant latency for the calculation of the variable-width remainder as R is varied.

At step 212, the remainder from step 204 is partitioned at $x^R$ into an upper portion and a lower portion. At step 214, the lower portion of the input polynomial and the upper portion of the remainder from step 204 are summed. At step 216, the remainder is calculated for the result of step 214 scaled by a factor of $x^R$ and divided by a divisor polynomial having a variable width of R. The fixed-width divisor polynomial of step 204 is a multiple of the variable-width divisor polynomial of step 216. At step 218, the result for the evaluation of the remainder for the input polynomial divided by the variable-width divisor polynomial is calculated by adding the lower portion of the remainder from step 204 and the remainder from step 216.

Figure 3:
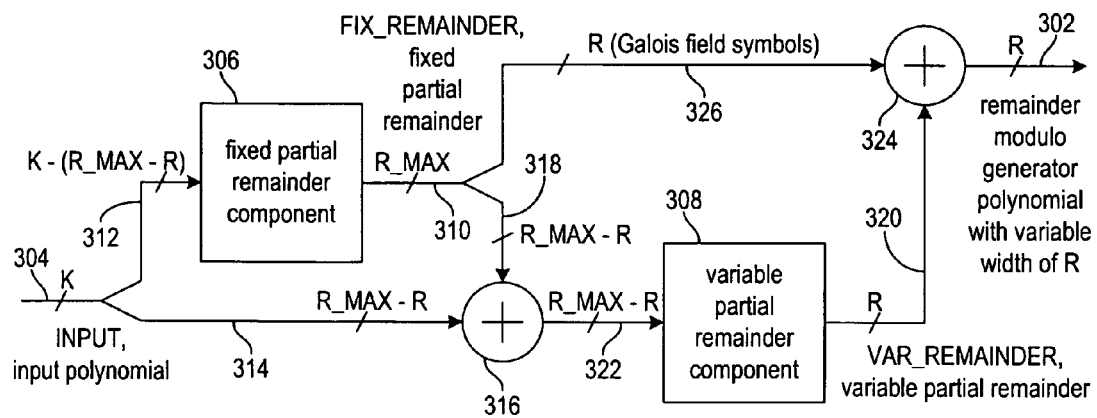
FIG. 3 is a block diagram of a circuit for calculating a remainder for a polynomial division, in accordance with one or more embodiments of the invention.

FIG. 3 is a block diagram of a circuit for calculating a remainder for a polynomial division in accordance with one or more embodiments of the invention. The calculation of the remainder on line 302 of an input polynomial on line 304 divided by a variable-width divisor polynomial is decomposed into two partial remainder stages, a fixed partial remainder stage 306 and a variable partial remainder stage 308. The input polynomial on line 304 has K Galois field symbols and the remainder on line 302 has R Galois field symbols.

The fixed partial remainder stage 306 calculates a remainder on line 310 for a portion on line 312 of the input polynomial on line 304 divided by a fixed-width divisor polynomial that is a multiple of the variable-width divisor polynomial. The upper K−(R_MAX−R) symbols on line 312 of the input polynomial on line 304 are supplied to the fixed partial remainder stage 306, while the lower R_MAX−R symbols on line 314 bypass the fixed stage 306.

The fixed remainder on line 310 from the fixed partial remainder stage 306 has R_MAX symbols. Galois field adder 316 adds the lower portion on line 314 of the input polynomial on line 304 to the upper R_MAX−R symbols on line 318 of the fixed remainder on line 310.

The second partial remainder stage 308 calculates a variable remainder on line 320 for the result on line 322 from adder 316 divided by the variable-width divisor polynomial. Galois field adder 324 adds the lower R symbols on line 326 of the fixed remainder on line 310 to the variable remainder on line 320.

The result from adder 324 is the remainder on line 302 for the input polynomial on line 304 divided by the variable-width divisor polynomial.

It will be appreciated that the widths for lines 312, 314, 318, 322, 320, 326, and 302, which are dependent on the value of R, is the width in symbols of the values carried on the respective lines. The symbols may be coefficients for associated polynomials and may be elements from a Galois field In one embodiment, because R may vary in value between 1 and R_MAX inclusive, physical signals corresponding to lines 312, 314, 318, 322, 320, 326, and 302 may have a width sufficient for any such value of R. For example, the physical signals corresponding to the remainder on line 302 may have a width of R_MAX symbols carrying R symbol values. In another embodiment, symbols are serially transferred on the lines 312, 314, 318, 322, 320, 326, and 302, with the number of symbols serially transferred being given by the width, which is dependent on the value of R as shown.

Figure 4:
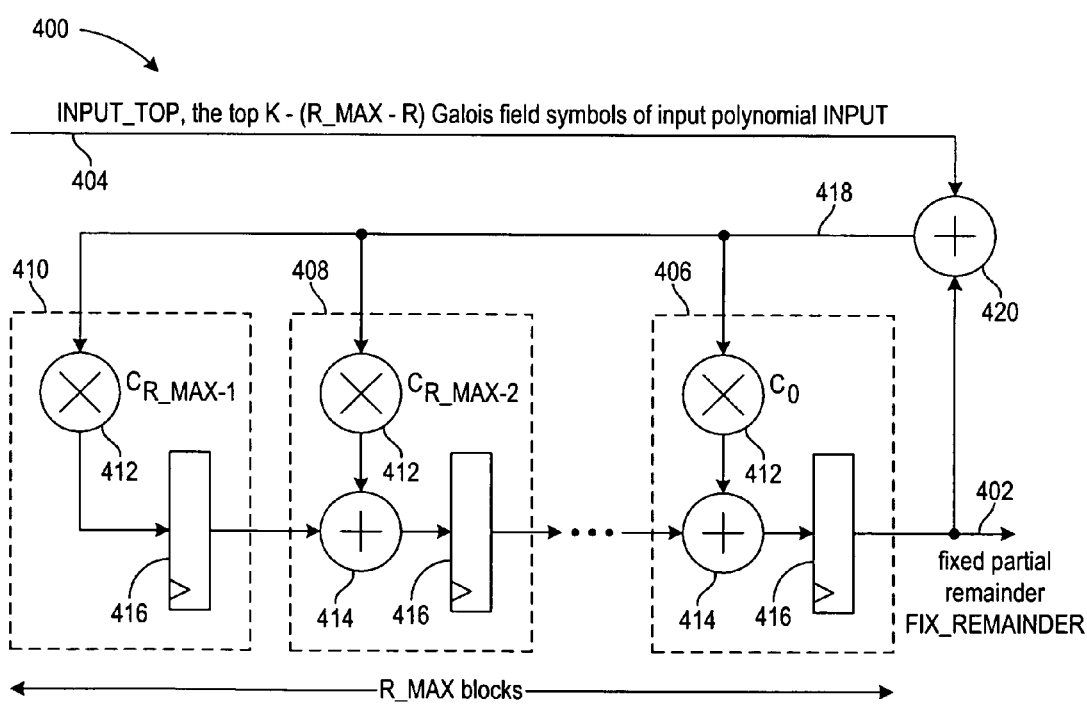
FIG. 4 is a block diagram of a circuit for calculating a fixed-width partial remainder for a polynomial division, in accordance with one or more embodiments of the invention.

FIG. 4 is a block diagram of a circuit 400 for calculating a fixed-width partial remainder for a polynomial division in accordance with one or more embodiments of the invention. Circuit 400 is a linear feedback shift register (LFSR) and corresponds to the fixed partial remainder component 306 in FIG. 3. The upper K−(R_MAX−R) symbols of the input polynomial are serially received on line 404, beginning with the most significant symbol. After all symbols have been serially received on line 404 in K−(R_MAX−R) iteration cycles, optionally preceded by zero padding symbols previously discussed, the R_MAX symbols of fixed-width partial remainder are serially produced on line 402, beginning with the most significant symbol, in R_MAX additional iteration cycles that may set feedback line 418 to a value of zero.

The circuit 400 has R_MAX blocks 406, 408, and 410. In general, each block 406, 408, and 410 has a multiplier 412, an adder 414, and a register 416. Adder 420 generates the feedback line 418 by adding intermediate results on line 402 with symbols of the input polynomial on line 404. The multipliers 412 each multiply a variable symbol on feedback line 418 from the Galois field by a constant from the Galois field, the adders 414 each add two variable symbols from the Galois field, and the registers 416 each store a symbol from the Galois field. The registers 416 have an initial value of zero. Some blocks may be simplified, for example, block 410 need not have an adder 414, the multiplier 412 may be eliminated from any block using a multiplication constant equal to one, the multiplier 412 and the adder 414 may be eliminated from any block using multiplication constant equal to zero, and two or more multipliers 412 using the same multiplication constant may be merged into a single multiplier.

In addition to the power series form previously discussed for the fixed-width divisor polynomial, the fixed-width divisor polynomial may be expressed in polynomial form as:

$$\text{fix\_divisor}(x) = C_{R\_MAX-1} x^{R\_MAX-1} + C_{R\_MAX-2} x^{R\_MAX-2} + \ldots + C_2 x^2 + C_1 x + C_0$$

with the most significant coefficient, $C_{R\_MAX-1}$, generally equal to one. The coefficients $C_{R\_MAX-1}$, $C_{R\_MAX-2}$, and $C_0$ from the polynomial form of the fixed-width divisor polynomial provide the respective multiplication constants for the multipliers 412 of blocks 410, 408, and 406. It will be appreciated that circuit 400 is simplified for polynomial coefficients having values that are zero, one, or repeated.

A circuit for directly evaluating the remainder for the division of an input polynomial by a variable-width divisor polynomial may be similar to FIG. 4 but with multipliers in the R_MAX blocks that must multiply by one of up to R_MAX different multiplication constants, effectively requiring each multiplier to operate on two variable symbols instead of multiplying a constant symbol and a variable symbol. Various embodiments of the invention instead employ a division of the input polynomial by a fixed-width divisor polynomial, which is a multiple of the variable-width divisor polynomial, to reduce overall circuit complexity.

Figure 5:
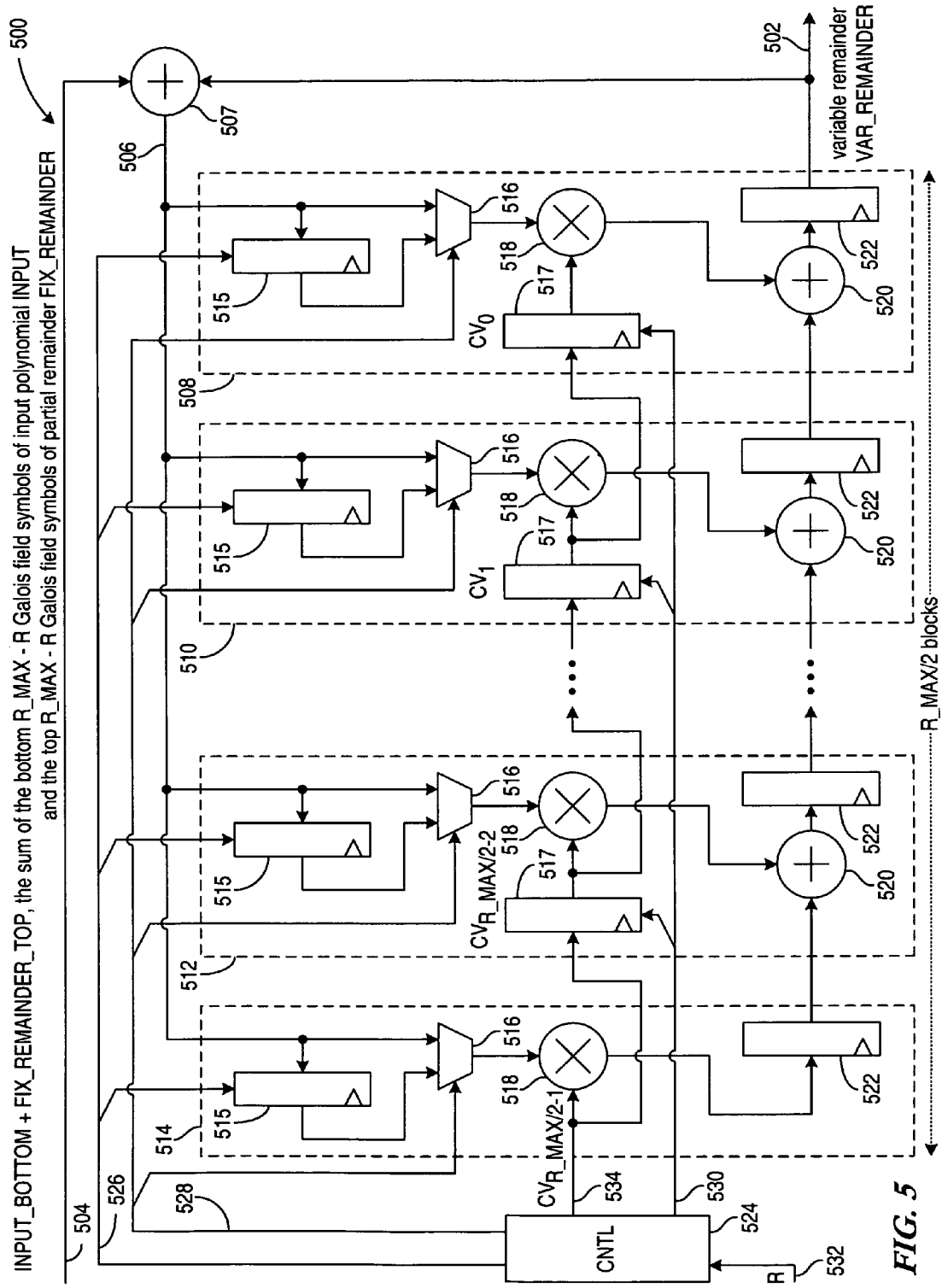
FIG. 5 is a block diagram of a circuit for parallel calculation of a variable width partial remainder for a polynomial division, in accordance with one or more embodiments of the invention.

FIG. 5 is a block diagram of a circuit 500 for parallel calculation of a variable width partial remainder on results line 502 for a polynomial division in accordance with one or more embodiments of the invention. Circuit 500 is a LFSR and corresponds to the variable partial remainder component 308 in FIG. 3. Circuit 500 is serially supplied with R_MAX−R dividend symbols from the Galois field on line 504, beginning with the most significant symbol, with R having a value between one and R_MAX inclusive. Feedback line 506 is the output of adder 507 that sums the dividend symbols on line 504 and intermediate results on results line 502. After all dividend symbols have been serially received on line 504 in R_MAX−R iteration cycles, the R symbols of the variable-width partial remainder are serially produced on results line 502, beginning with the most significant symbol, in R additional iteration cycles that may set feedback line 506 to a value of zero.

Circuit 500 includes R_MAX/2 blocks 508, 510, 512, and 514. Each block 508, 510, and 512, excluding the most significant block 514, includes a feedback register 515, a feedback multiplexer 516, a coefficient register 517, a multiplier 518, an adder 520, and a remainder register 522. The most significant block 514 includes a feedback register 515, a feedback multiplexer 516, a multiplier 518 and a remainder register 522, but does not include an adder and the coefficient register is externally provided by the variable partial remainder controller 524.

Each feedback register 515 stores a symbol from feedback line 506, when enabled by a respective feedback enable on line 526. Each feedback multiplexer 516 selects between the output from the feedback register 515, and the feedback line 506, according to a respective feedback select on line 528. Each coefficient register 517 stores a coefficient of the divisor polynomial, and is updated when enabled by a respective coefficient enable on line 530. Each multiplier 518 multiplies a variable symbol of the Galois field from a corresponding coefficient register 517 or the controller 524 with a variable symbol of the Galois field from the feedback multiplexer 516.

In addition to the power series form previously discussed for the variable-width divisor polynomial, the variable-width divisor polynomial may be expressed in polynomial form as var_divisor(x) equal to one of the following R_MAX equations depending on the value of R, with the first equation corresponding to R=R_MAX and the last equation corresponding to R=1:

$$C_{R\_MAX-1}x^{R\_MAX-1} + C_{R\_MAX-2}x^{R\_MAX-2} + \ldots + C_1 x + C_0$$

$$0x^{R\_MAX-1} + CV_{1,R\_MAX-2}x^{R\_MAX-2} + \ldots + CV_{1,1}x + CV_{1,0}$$

$$0x^{RMAX-1} + 0x^{R\_MAX-2} + \ldots + CV_{2,1}x + CV_{2,0}$$

et cetera, $$0x^{RMAX-1} + 0x^{R\_MAX-2} + \ldots + 0x + CV_{R\_MAX-1,0}$$

with the most significant non-zero coefficient, such as $C_{R\_MAX-1}$ and $CV_{1,R\_MAX-2}$, generally equal to one. The first equation above for var_divisor(x) at R=R_MAX is identical to the equation for fix_divisor(x). The most significant R_MAX-R coefficients are zero in the above equations for var_divisor(x).

The controller 524 may contain the R_MAX*R_MAX coefficients of the above equations for var_divisor(x). An input on line 532 provides the value of R to the controller 524 to select the R_MAX coefficients corresponding to one of the equations above for var_divisor(x). The controller 524 serially supplies the appropriate R_MAX coefficients in a corresponding number of iteration cycles in order from least significant coefficient, denoted $CV_0$, to most significant coefficient, denoted $CV_{R\_MAX-1}$, on line 534 to block 514.

Prior to supplying the symbols of the dividend on line 504, an initialization sequence shifts the least significant coefficients from the controller 524 through the coefficient registers 517 of blocks 514, 512, 510, and 508 to create the initial condition shown with coefficient $CV_{R\_MAX/2-1}$ in block 514, $CV_{R\_MAX/2-2}$ in block 512, $CV_1$ in block 510, and $CV_0$ in block 508. After the initialization sequence, an additional R_MAX iteration cycles calculates and outputs the R symbols of the variable-width partial remainder.

During circuit 500 operation for R<=R_MAX/2, each feedback select on line 528 causes each corresponding feedback multiplexer 516 to continuously select the feedback line 506, and each coefficient enable on line 530 causes continuous update of the corresponding coefficient register 517. For R<=R_MAX/2, after all dividend symbols are serially received on line 504 in R_MAX-R (at least R_MAX/2) iteration cycles, the remainder is available from the least significant R of the R_MAX/2 remainder registers 522. The remainder may be subsequently shifted out on line 502 in R additional iteration cycles.

Circuit 500 operation is somewhat more complicated for R>R_MAX/2. For R>R_MAX/2, during a first phase all dividend symbols are serially received on line 504 in R_MAX-R (less than R_MAX/2) iteration cycles, with each feedback select on line 528 causing each corresponding feedback multiplexer 516 to continuously select the feedback line 506, and each coefficient enable on line 530 causing continuous update of the corresponding coefficient register 517. After receiving the dividend symbols, the R_MAX/2 most significant symbols of the remainder are available from the R_MAX/2 remainder registers 522. Subsequently during a second phase, the controller 524 controls the lines 526, 528, and 530 to allow circuit 500 to continue producing the final R-R_MAX/2 least significant symbols of the remainder by directing feedback multiplexers 516 to select a value of the feedback line 506 captured and held in a feedback register 515 in successive blocks beginning with the most significant block 514, and advancing the coefficients registers 517 in alternate iteration cycles for these successive blocks.

Typically R_MAX is even, but it will be appreciated that an odd value for R_MAX requires (R_MAX+1)/2 blocks similar to blocks 514, 512, 510, and 508. It will also be appreciated that circuit 500 may be bypassed for R=R_MAX, as previously discussed in connection with FIG. 2, and then the controller 524 does not need to include the coefficients corresponding to R=R_MAX.

Figure 6:
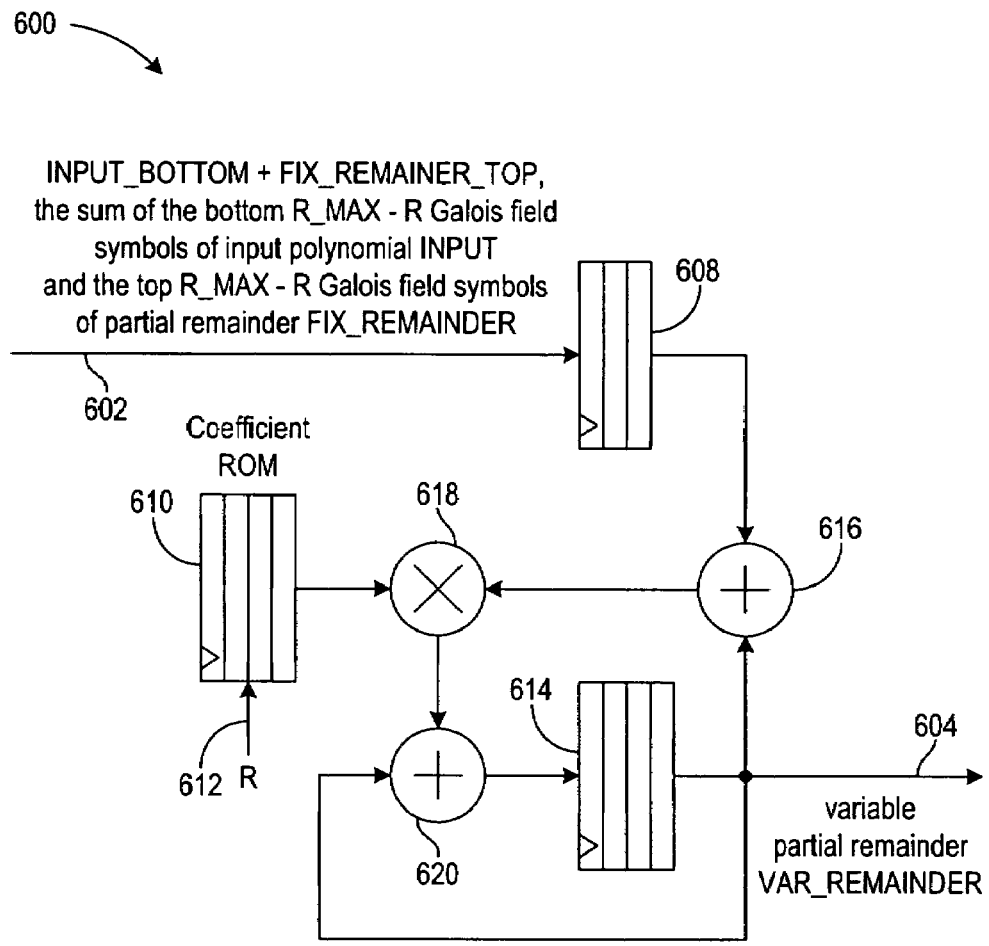
FIG. 6 is a block diagram of a circuit for serial calculation of a variable width partial remainder for a polynomial division, in accordance with one or more embodiments of the invention.

FIG. 6 is a block diagram of a circuit 600 for serial calculation of a variable width partial remainder for a polynomial division in accordance with one or more embodiments of the invention. Circuit 600 is a LFSR and corresponds to an alternative implementation of the variable partial remainder component 308 in FIG. 3. The R_MAX-R symbols of the dividend are serially accepted on line 602, beginning with the most significant symbol, and the R symbols of the variable-width partial remainder are serially provided on line 604, beginning with the most significant symbol.

The R_MAX-R symbols of the dividend are initially buffered in dividend memory 608, which has storage for R_MAX-1 symbols to handle the case when R is equal to one, but functionally operates as though it is a FIFO with a depth of R_MAX-R symbols.

The coefficient ROM 610 may hold the R_MAX*R_MAX coefficients of the equations for var_divisor(x). Coefficient ROM 610 receives the value of R on line 612 to select coefficients for the corresponding equation for var_divisor(x). During the calculation of the variable-width partial remainder, coefficient ROM 610 supplies the least significant R coefficients from the equation for var_divisor(x) corresponding to the value of R supplied on line 612. These least significant R coefficients are the coefficients that may have a non-zero value.

Remainder memory 614 holds the intermediate and final remainder results. Remainder memory 614 has storage for R_MAX symbols to handle the case when R is equal to R_MAX, but functionally operates as though it is a FIFO with a depth of R symbols. Initially, remainder memory 614 is cleared.

During operation of circuit 600 after the dividend symbols are stored in dividend memory 608, each successive symbol of the dividend is repeatedly output for R successive iteration cycles. Thus, the functional FIFO of dividend memory 608 is advanced one every R successive iteration cycles. In contrast, the coefficient ROM 610 circularly switches to the next most significant of the R coefficients every iteration cycle and the functional FIFO of remainder memory 614 advances every iteration cycle by providing an output symbol and accepting an input symbol.

Adder 616 adds the output from dividend memory 608 with the output from remainder memory 614, the resulting sum is multiplied with a coefficient from coefficient ROM 610 by multiplier 618, the resulting product is added by adder 620 with the output from remainder memory 614, and the resulting sum is written to the remainder memory 614. After (R_MAX−R)*R iteration cycles, the variable-width partial remainder is available in remainder register 614 and may be serially shifted out on line 604 by R additional cycles. While the variable-width remainder is being shifted out, zero values may be shifted into remainder register 614 to clear remainder register 614.

Circuit 600 requires only one Galois field variable multiplier 606 and requires at most $R\_MAX^2/4+R\_MAX$ cycles of latency to input the dividend, calculate the remainder, and output the remainder. Circuit 600 has a throughput rate of at least one partial remainder calculation every $R\_MAX^2/4+R\_MAX/2$ cycles. The maximum latency and minimum throughput occurs for R equal to R_MAX/2. Circuit 500 of FIG. 5 requires R_MAX/2 Galois field variable multipliers 518 and requires R_MAX cycles of latency to input the dividend, calculate the remainder, and output the remainder. Circuit 500 has a throughput rate of one partial remainder calculation every R_MAX cycles.

Figure 7:
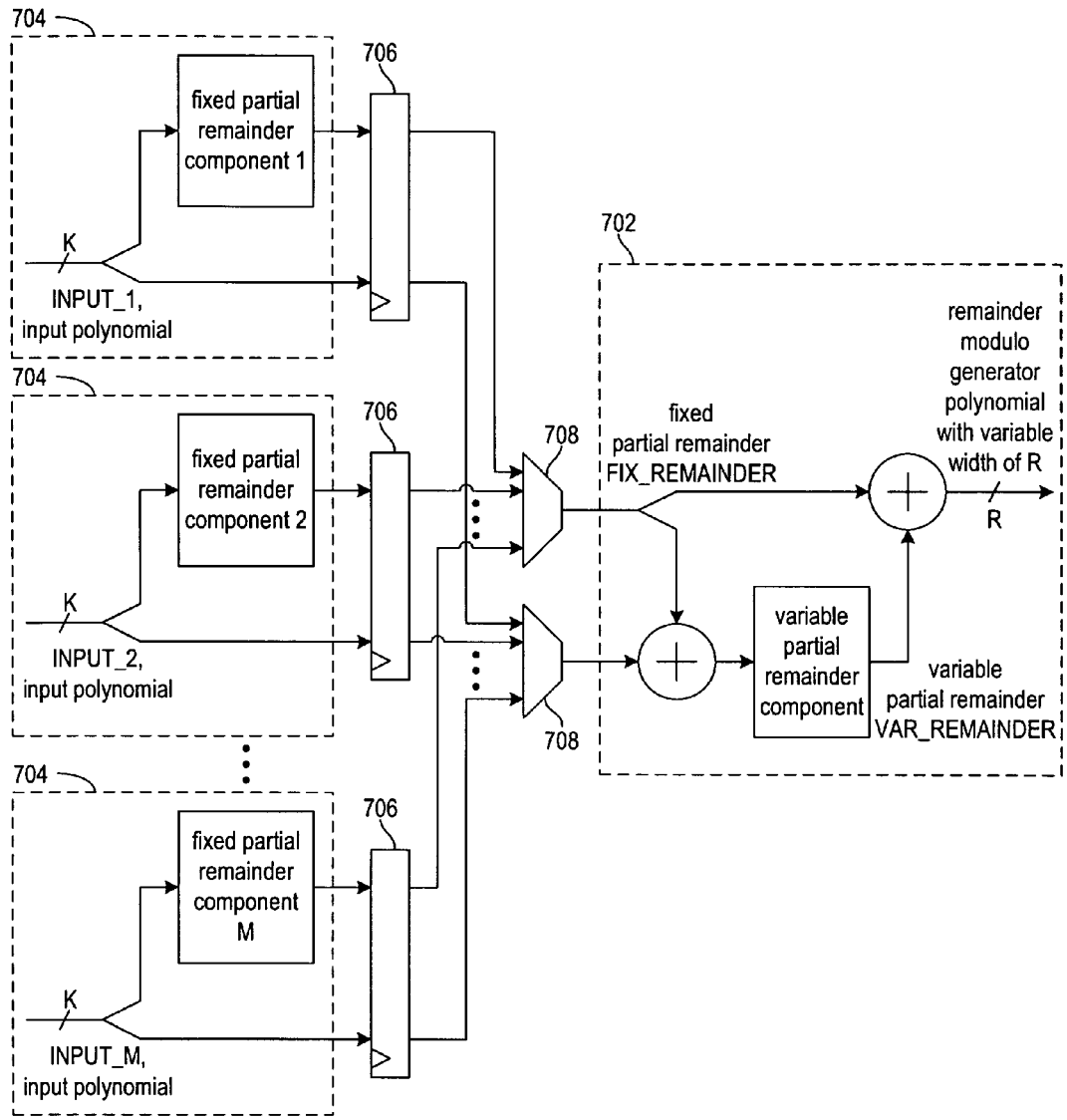
FIG. 7 is a block diagram of a circuit for time multiplexing the variable portion of the remainder calculation for a polynomial division, in accordance with one or more embodiments of the invention.

FIG. 7 is a block diagram of a circuit for time multiplexing the variable portion 702 of the remainder calculation for a polynomial division in accordance with one or more embodiments of the invention. A single variable portion 702 of the remainder calculation may be time multiplexed to process the intermediate results from a plurality of M copies of the fixed portion 704 of the remainder calculation. The variable portion 702 may provide a similar function to variable partial remainder component 308 of FIG. 3 and each fixed portion 704 may provide a similar function to fixed partial remainder component 306 of FIG. 3.

The calculation of a fixed-width partial remainder by a fixed portion 704 may require significantly more iteration cycles than the calculation of a variable-width partial remainder by variable portion 702. For example, the fixed-width partial remainder calculation by a fixed portion 704 may have a throughput of a partial remainder every 255 cycles and the variable-width partial remainder calculated by a serial version of variable portion 702 of may have a throughput of a partial remainder every 72 cycles, for typical values of K equal to 239 and R_MAX equal to 16. Thus, a single variable-width partial remainder circuit 702 may have sufficient throughput to process the intermediate results from 3 copies of the fixed-width partial remainder circuit 704.

The intermediate results from the fixed portions 704 are buffered in registers 706. Multiplexers 708 select intermediate results from one the registers 706 to supply the variable portion 702.

The present invention is believed to be applicable to a variety of systems for polynomial division and is thought to be particularly applicable and beneficial in reducing the circuit area and computation time required to compute a remainder in polynomial division. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for generating a remainder from a division of a first polynomial by a second polynomial, comprising:
a first sub-circuit adapted to generate a first partial remainder and having an input arranged to receive coefficients of the first polynomial excepting a surplus number of least significant coefficients, wherein the second polynomial has a variable width, the first partial remainder has a fixed width greater than or equal to the variable width, and the surplus number is given by a difference between the fixed width and the variable width;
a first adder adapted to generate a sum of data at first and second inputs, the first input arranged to receive the surplus number of the least significant coefficients of the first polynomial, and the second input arranged to receive the surplus number of most significant coefficients of the first partial remainder;
a second sub-circuit adapted to generate a second partial remainder from the sum received at an input; and
a second adder adapted to generate the remainder from data at first and second inputs, the first input arranged to receive coefficients of the first partial remainder excepting the surplus number of the most significant coefficients, and the second input arranged to receive the second partial remainder.

2. The circuit of claim 1, wherein the second sub-circuit includes a second input arranged to receive a value that specifies the variable width.

3. The circuit of claim 1, wherein the first sub-circuit is further adapted to perform a polynomial division by a multiple of the second polynomial in generating the first partial remainder, and the second sub-circuit is further adapted to perform a polynomial division by the second polynomial in generating the second partial remainder.

4. The circuit of claim 3, wherein the multiple of the second polynomial of the first sub-circuit is the second polynomial.

5. The circuit of claim 3, wherein the first sub-circuit includes a linear feedback shift register (LFSR) adapted to generate the first partial remainder, coupled to the input of the first sub-circuit, and having fixed feedback coefficients based on the multiple of the second polynomial.

6. The circuit of claim 5, wherein each fixed feedback coefficient of the LFSR is a respective coefficient of the multiple of the second polynomial.

7. The circuit of claim 3, wherein the second sub-circuit includes a linear feedback shift register (LFSR) adapted to generate the second partial remainder, coupled to the input of the second sub-circuit, and having variable feedback coefficients based on the second polynomial.

8. The circuit of claim 7, wherein each variable feedback coefficient of the LFSR cycles through coefficients of the second polynomial.

9. The circuit of claim 3, wherein the first sub-circuit is further adapted to perform the polynomial division by the multiple of the second polynomial of a scaling of the first polynomial excepting the surplus number of the least significant coefficients.

10. The circuit of claim 9, wherein the second sub-circuit is further adapted to perform the polynomial division by the second polynomial of a scaling of the sum.

11. The circuit of claim 10, wherein the first partial remainder generated by the first sub-circuit, the sum generated by the first adder, and the second partial remainder generated by the second sub-circuit are intermediate polynomials.

12. The circuit of claim 11, wherein the coefficients of the first polynomial, coefficients of the multiple of the second polynomial of the first sub-circuit, coefficients of the second polynomial, coefficients of the first partial remainder generated by the first sub-circuit, coefficients of the sum generated by the first adder, coefficients of the second partial remainder generated by the second sub-circuit, and coefficients of the remainder are elements from a Galois field.

13. The circuit of claim 12, wherein the coefficients of the first polynomial, coefficients of the multiple of the second polynomial of the first sub-circuit, coefficients of the second polynomial, coefficients of the first partial remainder generated by the first sub-circuit, coefficients of the sum generated by the first adder, coefficients of the second partial remainder generated by the second sub-circuit, and coefficients of the remainder are elements from the Galois field of GF2.

14. The circuit of claim 12, wherein the multiple of the second polynomial of the first sub-circuit and the second polynomial are each generator polynomials for a respective block code.

15. The circuit of claim 14, wherein the multiple of the second polynomial of the first sub-circuit and the second polynomial are each generator polynomials for a respective Reed Solomon code.

16. A circuit for generating a remainder for a division of a first polynomial by a second polynomial, comprising:

means for partitioning the first polynomial into a first part and a second part, wherein the second polynomial has a variable width that is less than or equal to a fixed width, a surplus number is given by a difference between the fixed width and the variable width, the second part includes the surplus number of least significant coefficients of the first polynomial, and the first part includes coefficients of the first polynomial excepting the surplus number of the least significant coefficients;

means for generating a first partial remainder having the fixed width with a polynomial division of the first part by a multiple of the second polynomial;

means for partitioning the first partial remainder into a third part and a fourth part, wherein the third part includes the surplus number of most significant coefficients of the first partial remainder and the fourth part includes the coefficients of the first partial remainder excepting the surplus number of the most significant coefficients;

means for generating a second partial remainder having the variable width with a polynomial division by the second polynomial of the sum of the second part and the third part; and means for generating the remainder for the division by summing the fourth part and the second partial remainder.

* * * * *